H. B. COATS.
VEHICLE WHEEL.
APPLICATION FILED JUNE 4, 1917.

1,279,265.

Patented Sept. 17, 1918.
4 SHEETS—SHEET 1.

Inventor
HENRY B. COATS.
By Lockwood & Lockwood
Attorneys.

H. B. COATS.
VEHICLE WHEEL.
APPLICATION FILED JUNE 4, 1917.
1,279,265.
Patented Sept. 17, 1918.
4 SHEETS—SHEET 2.
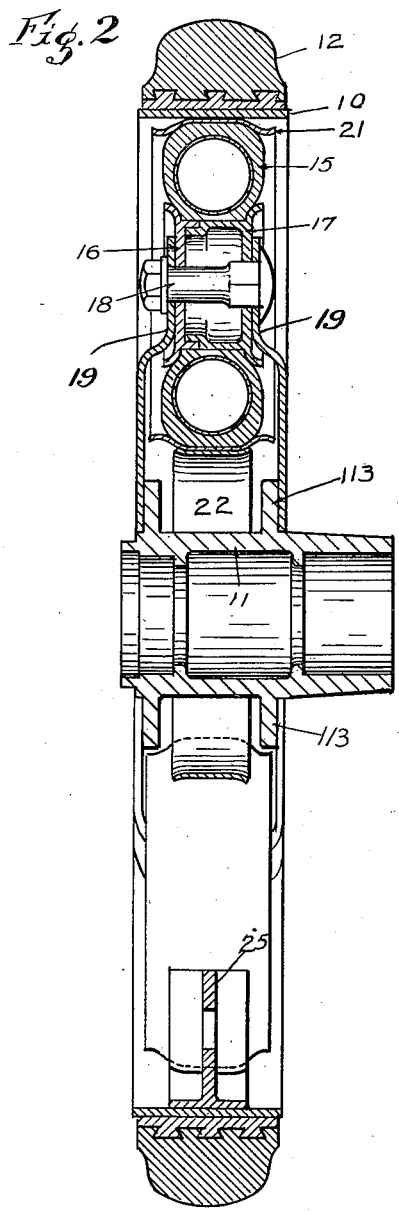
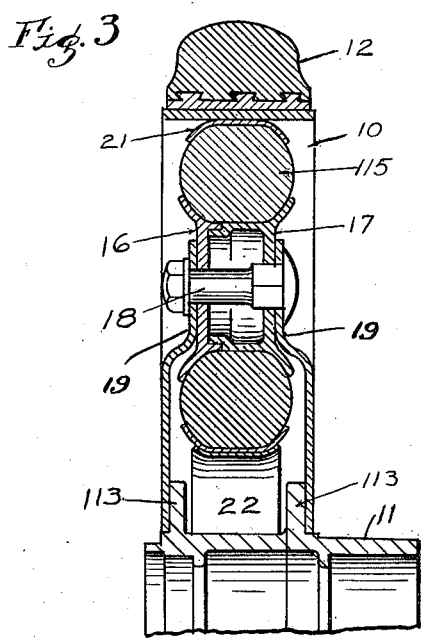
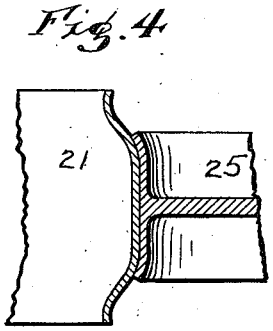
Inventor
HENRY B. COATS.
By Lockwood & Lockwood
Attorney

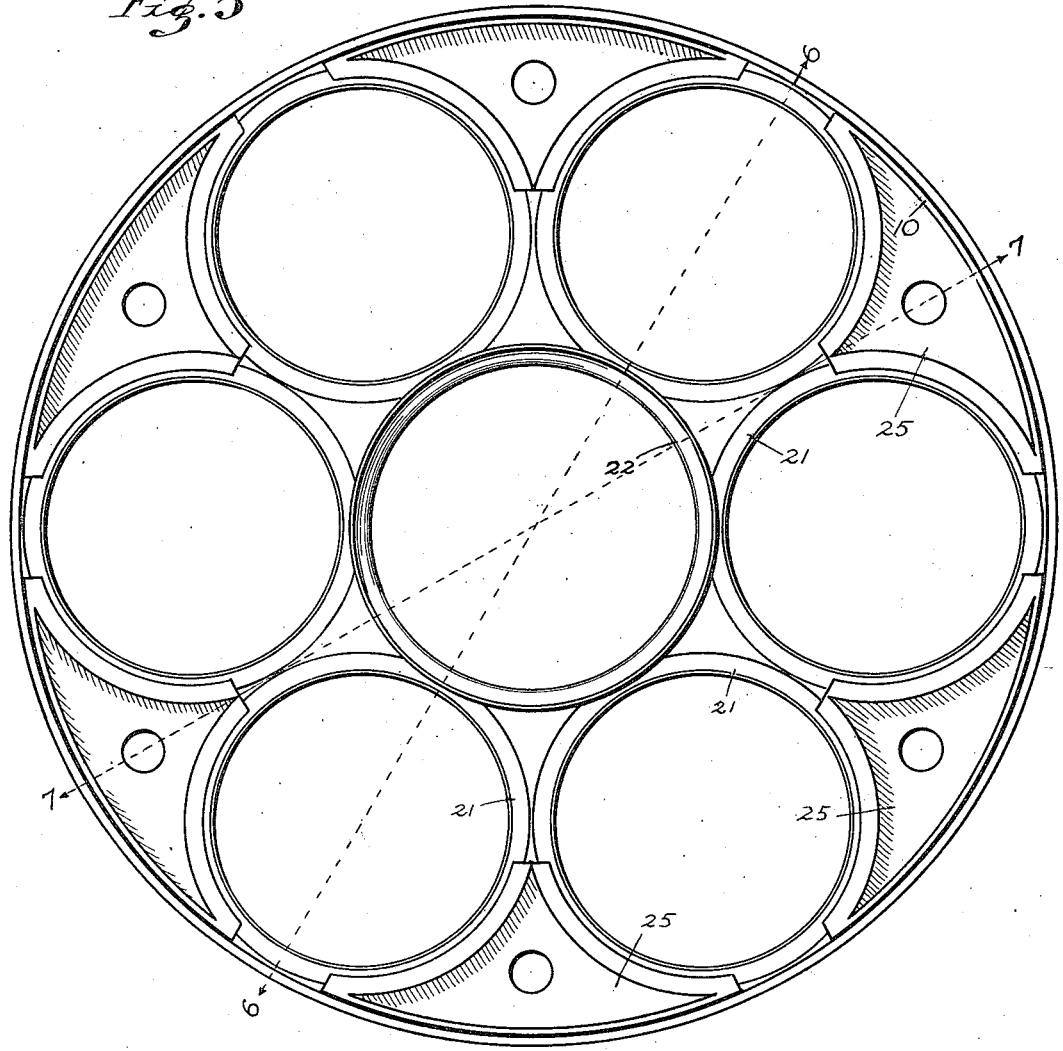

H. B. COATS.
VEHICLE WHEEL.
APPLICATION FILED JUNE 4, 1917.

1,279,265.

Patented Sept. 17, 1918.
4 SHEETS—SHEET 4.

Inventor
HENRY B. COATS.
By Lockwood & Lockwood
Attorney

UNITED STATES PATENT OFFICE.

HENRY B. COATS, OF CRAWFORDSVILLE, INDIANA.

VEHICLE-WHEEL.

1,279,265.                 Specification of Letters Patent.     Patented Sept. 17, 1918.

Application filed June 4, 1917. Serial No. 172,660.

*To all whom it may concern:*

Be it known that I, HENRY B. COATS, a citizen of the United States, and a resident of Crawfordsville, county of Montgomery, and State of Indiana, have invented a certain new and useful Vehicle-Wheel; and I do hereby declare that the following is a full, clear, and exact description thereof, reference being had to the accompanying drawings, in which like letters refer to like parts.

The object of this invention is to improve the construction and operation of vehicle wheels, particularly those adapted for automobiles, especially motor trucks wherein there is a series of annular cushions mounted between the hub and tire rim for yieldingly supporting the two members in relation to each other.

One feature of the invention consists in the wheel being made by nesting the parts thereof, particularly the tire rim, hub member and an intermediate series of rims for said annular cushions, so that said cushion receiving rims and hub member will be under compression and the tire rim under tension in the completed wheel.

This makes said metal structure of the wheel a unitary one and yielding instead of being rigid and such tension and compression tends to hold the parts in place.

In making such metal structure for said type of wheel, the hub member and a surrounding series of cushion receiving rims are nested within the tire rim so as to fit snugly therein, and then the tire rim is shrunk so as to put the tire rim under tension and said inner members under compression permanently. Furthermore, the periphery of the hub member is concave in cross section and the cushion receiving rims are convex in cross section so that the parts of the metal structure will interfit and when under compression, as stated, they will not be dislocated by lateral stress.

Figure 1:
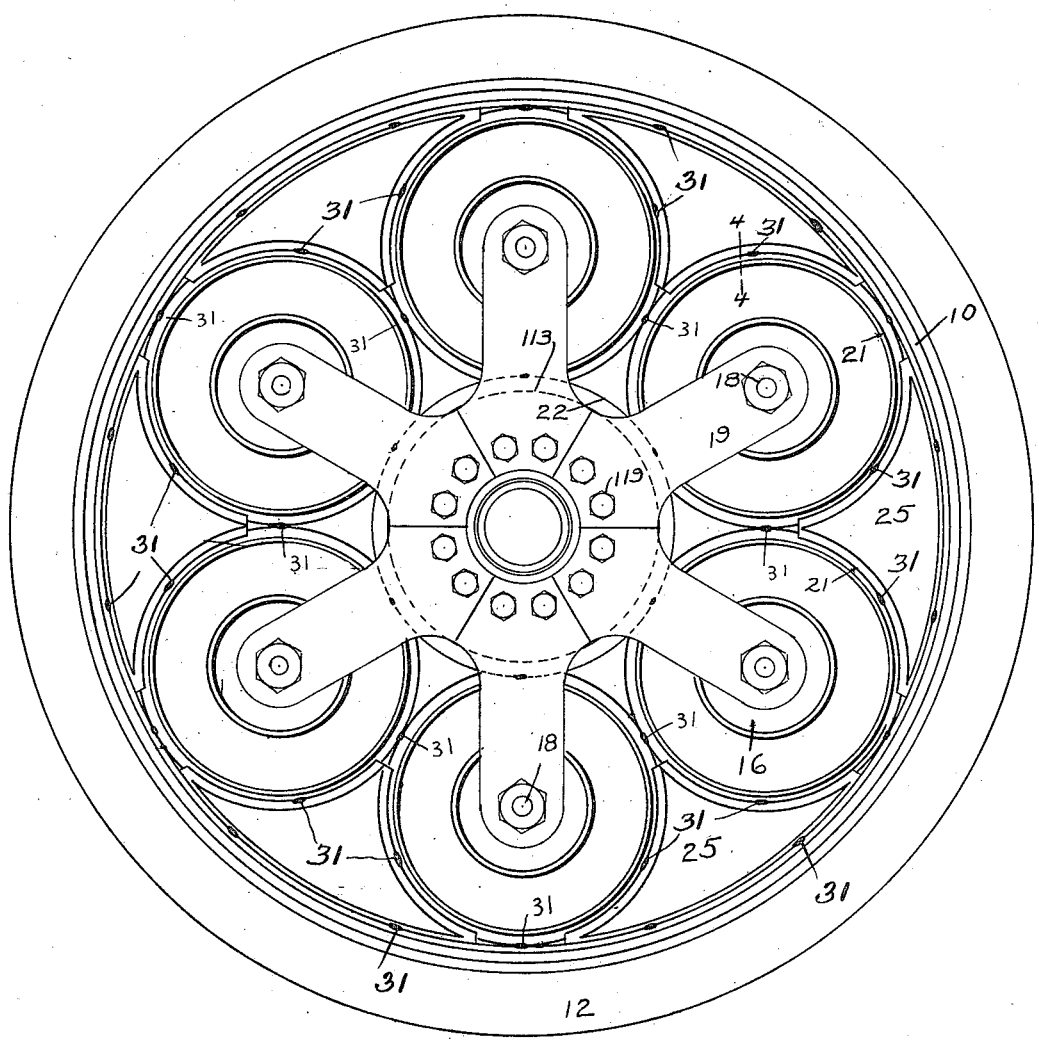
Figure 6:
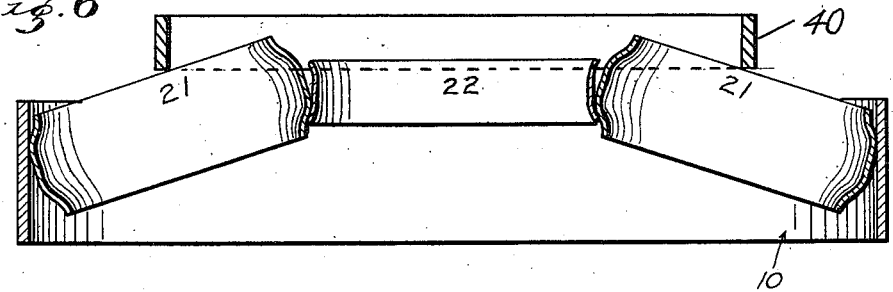
Figure 7:
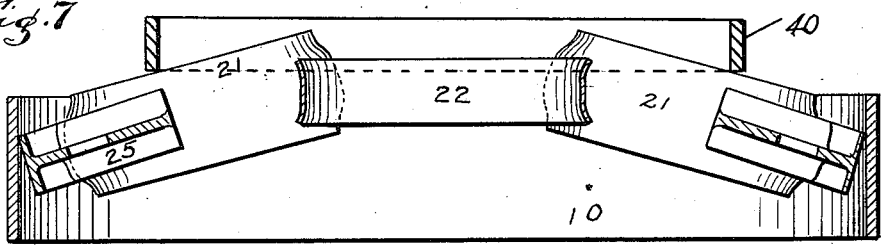
Figure 8:
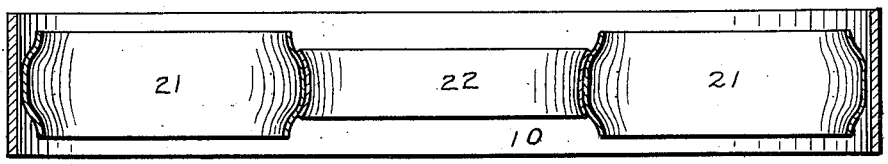
Figure 9:
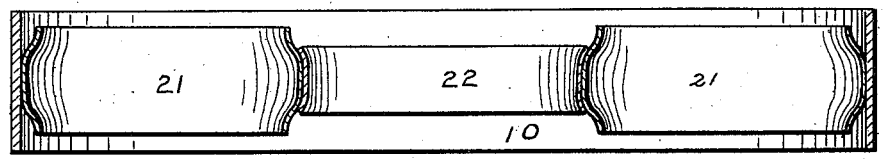

The full nature of the invention will be understood from the accompanying drawings and the following description and claims:

In the drawings, Figure 1 is a side elevation of said wheel with the side plates removed. Fig. 2 is a transverse section through said wheel containing pneumatic cushions. Fig. 3 is a transverse section through half of said wheel showing a solid annular cushion. Fig. 4 is a section on an enlarged scale on the line 4—4 of Fig. 1. Fig. 5 is a plan view of the parts of the cushion holding structure showing them in their position in the first step of assembling them. Fig. 6 is a section on the line 6—6 of Fig. 5. Fig. 7 is a section on the line 7—7 of Fig. 5. Fig. 8 is the same as Fig. 6 after the intermediate parts have been forced down into place in the tire rim and before the latter is compressed or shrunk. Fig. 9 is the same as Fig. 8 after the tire rim is compressed or shunk.

The drawings herein show a vehicle wheel having an annular metal tire rim 10 transversely flat, although this form is not necessary and upon said rim there is mounted a standard type of rubber tire 12 in a manner common in the art, but the invention is not limited to the tire being made of rubber, as it may be made of any other desired material and may be solid or pneumatic, as desired.

The hub member of the wheel consists of a hub 11 adapted to carry the load and to fit within the tire rim and have radial movement relative thereto under the influence of the load, just as the tire rim has radial movement relative to the hub under the influence of the load. The hub has a pair of annular flanges 113 surrounding it to which radial arms 19 are secured by bolts or rivets 119. In the wheel shown there is a series of six radial arms 19 on each side of the wheel and which extend for a little more than half the distance from the hub to the tire rim.

The hub structure is supported yieldingly within the tire rim by a series of annular cushions. These may be pneumatic cushions 15, as shown in Fig. 2, or solid rubber cushions 115, as shown in the modified form in Fig. 3. These annular cushions are mounted on means carried by and between the outer ends of each pair of radial arms 19 of the hub structure. Thus, as seen in Fig. 2, a bolt 18 extends through the outer ends of each pair of arms 19 and has mounted on it two cylindrical plates 16 and 17 having engaging or interlocking peripheries and outwardly turned flanges so that said two plates when held together by the bolt 18, furnish a holding means for the annular cushion. Said cushion surrounds said holding means and the periphery of said holding means formed of the plates 16 and 17 is in the nature of a clencher rim for the internal periphery of the annular cushion.

The outer periphery of each annular cushion is held by an external cushion receiving rim 21 made of metal and preferably concave, as shown, that is, with a flat outer central tire surface with inwardly extending flanges for partially surrounding and clenching the cushion. These cushion receiving rims are like rings and there is a series of them located within the tire rim 10 and engaging its inner surface and held in such position by a central annular member 22 which has a concave periphery so as to receive and fit snugly with the external convex surface of the series of cushion receiving rims 21. The central annular member 22 surrounds the hub and is normally concentric with the hub and tire rim and is placed far enough from the hub to allow ample relative movement of the hub structure, using the phrase "tire structure" here to include the tire rim, annular cushions, the cushion receiving rims 21 and the central member 22. This enables the hub structure to move downward under the influence of a load or the tire structure to move upward when passing over an elevation in the roadway, said two general structures moving relatively to each other and yieldingly as the load and road require.

Triangular brace plates 25 are located between each adjacent pair of cushion receiving rims 21 and the outer tire rim 10, as seen in Figs. 1, 4 and 5. The portion of said brace plate adjacent the tire rim is straight across transversely, as shown in the lower part of Fig. 2, but the portions thereof adjacent the cushion receiving rims are concave, as shown in Fig. 4, so as to interfit with the same. There is one of these brace plates between each pair of cushion receiving rims, as seen in Fig. 5.

The triangular plates 25 and the cushion receiving rims 21 are secured together preferably by spot welding as at 31. This is to prevent creeping of the parts while the wheel is in use. It is not so necessary that the cushion receiving rims 21 be secured to the other parts as it is that the brace plates 25 be secured to the tire rim for they alone would suffice to prevent creeping or angular displacement of the cushion receiving rims.

The method of forming the wheel and assembling the essential parts of the metal structure will now be explained.

The tire rim 10, the cushion receiving rims 21, the centrally located annular member 22 and the reinforcing braces 25 are separately made of stamped or rolled steel. In assembling these parts the bracing members 25 are first located within the tire rim 10 loosely and then the series of cushion receiving rims 21 are put in place so as to form an annular series thereof, one cushion receiving rim 21 being located between each pair of bracing members 25 so that the cushion receiving rims will be embraced by the cupped adjacent surfaces of the reinforcing braces, as shown in Fig. 4. The cushion receiving rims 21 are all made of such diameter that they will engage or abut against each other in series when thus placed and will also extend very close to the tire rim, as shown in Fig. 5. Then the inner portions of the series of cushion receiving rims 21 are lifted up to some extent so that the central annular member 22 may be placed between them, as shown in Fig. 6, and with its cupped periphery embracing the adjacent portions of the cushion receiving rims. The central member 22 is so large in diameter that it cannot be placed in position within the series of cushion receiving rims until their inner portions are elevated somewhat, as stated and shown, and, therefore, when the central member 22 is assembled by hand, the structure will be pyramidal, as shown in Figs. 6 and 7.

The next step in the process is to force the central portion of assembled parts down from the pyramidal form, shown in Figs. 6 and 7, to a substantially horizontal position, as shown in Fig. 8. This is usually done by placing an annular ring-like member 40 concentrically of the structure shown in Figs. 6 and 7, and forcing it downward so that all of the cushion receiving rims and the central member 22 will be forced down equally and simultaneously to the horizontal position shown in Fig. 8. When in this horizontal position, as shown in Fig. 8, the bracing members 25 will engage the tire rim, as shown in Fig. 5, for there must be a sufficient clearance between the tire rim and the cushion receiving rims to allow for the parts to be assembled in pyramidal form and forced down into horizontal position, as above explained.

The next step in the process is the shrinking or compression of the tire rim 10 so as to reduce its diameter, say three-eighths of an inch or the like, whatever the necessary clearance must be to assemble the parts, as above explained, and this contraction of the tire rim will put said rim under great tension and the intermediate parts 21 and 22 under great compression. Then the tire rim will forcibly engage the outer portions of all of the cushion receiving rims 21 and said cushion receiving rims will be under considerable compression by and between the tire rim 10 and the centrally located member 22, and the bracing members 25 coöperate with the tire rim in the compression of the cushion receiving rims. This compression or tension of said members secures them tightly together into one unitary structure. Furthermore, such compression of said members, with the cupped shape of their engaging surfaces holds the parts in permanent position and against lateral displacement.

The shrinking or compression of the tire rim 10 is accomplished by any suitable apparatus which is already common in the art, but it is necessary that the tire rim and the central member 22, by the compression referred to shall be maintained absolutely concentric in order to preserve the symmetry and balance of the wheel.

After the foregoing, said parts of the metal portion of the wheel are secured together by spot welding or otherwise and particularly it is important to secure the brace members 25 effectively to the tire rim 10. Finally the cushions and other parts of the wheel are assembled and thus the wheel made complete for use.

The invention claimed is:

1. A vehicle wheel of the kind described which includes an annular tire rim, an annular member centrally located therein, and a series of annular cushion receiving rims located between and in engagement with the tire rim and central member, said tire rim being shrunk so as to place said cushion receiving rims and central member under compression and said tire rim under tension.

2. A vehicle wheel of the kind described which includes an annular tire rim, a member centrally located therein, a series of annular cushion receiving rims located between and interfitting between the tire rim and central member, and bracing means between and engaging each pair of cushion receiving rims and the tire rim, said parts being constructed so that said tire rim will be under tension and the other parts which are inclosed within the tire rim be under compression.

3. A vehicle wheel of the kind described which includes an annular tire rim, a member centrally located therein, a series of annular cushion receiving rims located between and interfitting between the tire rim and central member, and bracing means between and engaging each pair of cushion receiving rims and the tire rim, the adjacent and engaging portions of said cushion receiving rims, bracing means and central member being cupped transversely so as to interfit to prevent their lateral displacement and said parts being constructed so that said tire rim will be under tension and the other parts which are inclosed within the tire rim be under compression.

4. A vehicle wheel of the kind described which includes an annular tire rim, a member centrally located therein, a series of annular cushion receiving rims located between and interfitting between the tire rim and central member, and bracing means between and engaging each pair of cushion receiving rims and the tire rim, the tire rim being shrunk on the inclosed parts so as to put them under compression and said tire rim under tension.

5. A vehicle wheel of the kind described which includes an annular tire rim, a member centrally located therein, a series of annular cushion receiving rims located between and interfitting between the tire rim and central member, bracing means between and engaging each pair of cushion receiving rims and the tire rim, said parts being constructed so that said tire rim will be under tension and the other parts which are under compression and said tire rim under tension, and means for securing said bracing members rigidly to the tire member.

6. A vehicle wheel of the kind described which includes an annular tire rim, a member centrally located therein, a series of annular cushion receiving rims located between and interfitting between the tire rim and central members, bracing means between and engaging each pair of cushion receiving rims and the tire rim, said parts being constructed so that said tire rim will be under tension and the other parts which are inclosed within the tire rim be under compression, and means for securing said parts together at their points of engagement.

In witness whereof, I have hereunto affixed my signature.

HENRY B. COATS.